(12) United States Patent
Celata et al.

(10) Patent No.: US 6,371,054 B1
(45) Date of Patent: Apr. 16, 2002

(54) SYSTEM AND METHOD FOR INHIBITING CREATURES FROM ENTERING DEFINED REGIONS

(76) Inventors: Jack Celata, 6 Biscayne Dr., Billerica, MA (US) 01821; Michael J. Kudla, 3 Summit Ave., Groton, MA (US) 01450

( * ) Notice: Subject to any disclaimer, the term of this patent is extended or adjusted under 35 U.S.C. 154(b) by 0 days.

(21) Appl. No.: 09/532,374

(22) Filed: Mar. 21, 2000

(51) Int. Cl.$^7$ .................. A01K 37/00; A01K 15/04; G08B 9/00; A01M 31/06
(52) U.S. Cl. .................. 119/712; 119/721; 116/22 A; 43/1
(58) Field of Search ................... 119/712, 719, 119/720, 721, 908; 116/22 A; 43/1

(56) References Cited

U.S. PATENT DOCUMENTS

| | | | |
|---|---|---|---|
| 4,733,633 A | * 3/1988 | Yarnell, Sr. et al. | 119/721 |
| 5,425,192 A | * 6/1995 | Negre | 43/1 |
| 5,576,694 A | * 11/1996 | Touchton et al. | 119/721 |
| 5,642,690 A | * 7/1997 | Calabrese et al. | 119/721 |
| 5,884,426 A | * 3/1999 | Ishida | 43/1 |
| 5,918,404 A | * 7/1999 | Ohba | 43/1 |
| 5,967,094 A | * 10/1999 | Grimsley et al. | 119/721 |

* cited by examiner

*Primary Examiner*—Charles T. Jordan
*Assistant Examiner*—Elizabeth Shaw
(74) *Attorney, Agent, or Firm*—Weingarten, Schurgin, Gagnebin & Hayes LLP

(57) ABSTRACT

An electrical shock system is provided for deterring birds from entering defined regions. The electrical shock system includes a wiring configuration that maximizes that amount of the defined regions that will be covered by the system while minimizing the amount of wires so that the system may be installed easily with efficient use of the necessary wires. As a result, the bird control system of the present invention will provide better coverage over the desired regions and will therefore provide more effective in permanently keeping the birds from returning to the desired regions.

10 Claims, 1 Drawing Sheet

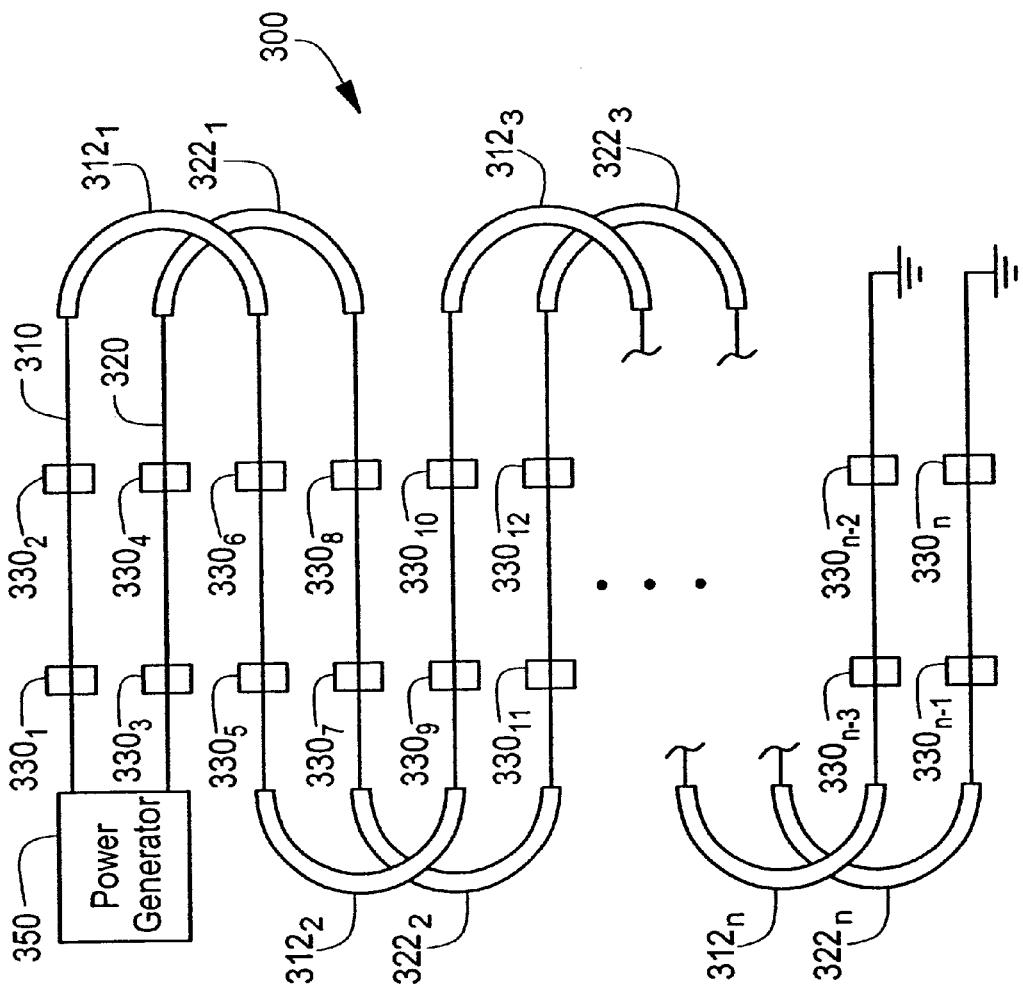
*FIG. 3*
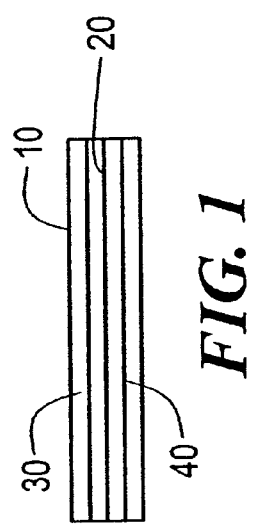
*FIG. 1*
*FIG. 2*

SYSTEM AND METHOD FOR INHIBITING CREATURES FROM ENTERING DEFINED REGIONS

FIELD OF THE INVENTION

This invention relates to a system and method for inhibiting creatures from penetrating defined regions. More specifically, this invention relates to inhibiting birds from roosting on ledges and roofs of buildings by establishing deterrent grid-like zones within the defined regions.

BACKGROUND OF THE INVENTION

Although homeowners, building owners, farmers and the like have fought for years to protect their property from birds, animals and other creatures, fool-proof devices have yet to be developed due to the intelligence and adaptability of these creatures. In particular, the bird control industry has specific needs for protecting property owners from unwanted birds, their droppings and nesting materials. In the past, bird control has been left to individual use of various homemade apparatus. For instance, in about the mid-1900s, bird control technology included porcupine wire, and sharp spikes sticking up from a metal base, which were glued or clipped onto building ledges in order to prevent birds from landing on the ledges. However, bird control devices and systems have remained relatively unadvanced from this time because the intelligence and adaptability of the birds have allowed them to outwit primitive devices and systems.

In addition to merely being nuisances, property owners and the community in general have an interest in preventing birds and other unwanted creatures from entering populated regions due to the diseases that they transmit. In particular, bird control is presently a large problem in urban areas because they are a perfect mechanism for spreading disease as they travel great distances. For instance, birds harbor over forty types of parasites and can internally host over sixty types of infectious diseases. Even though human interaction with most bird species is minimal, certain species such as the pigeon, starling and house sparrow have adapted to urban communities and have been brought into close proximity with humans. As a result, these birds pose a serious health risk, and inflict damage to property.

Further examples of bird control devices and systems that are presently known include pesticides and poisons, tack strips, sticky bird gel, chicken wire, fishing line and decoy devices (plastic owls, snakes and hawks). None of these techniques, devices, or systems provide optimal control in deterring birds. For example, pesticides and poisons are undesirable due to the harm caused to the birds and the environment. Tack strips, bird gel, fishing line, chicken wire, and spikes are all ineffective, not very durable and unsightly. While decoy devices may keep some birds away temporarily, the birds usually return and are often even attracted to them.

However, one technique that has been promising is the use of electrical shock devices. This technique involves applying an electrical pulse through a wire so that the bird will receive a shock and will be conditioned to leave the site permanently. One such device is the Bird-Shock device manufactured by Bird-Barrier. This device is a three wire system embedded into a PVC base. As illustrated in FIG. 1, a positive wire 20 is positioned in the middle of the PVC base 10 and the positive wire 20 is surrounded by ground wires 30 and 40. The PVC base 10 including the three wires 20, 30 and 40 are positioned on the desired regions, for example, along a ledge or the edge of a roof by glue, nails or the like. Once installed, when a bird touches the positive wire 20 and either one of the ground wires 30 or 40, a static electrical shock is transmitted through the bird. As a result of this harmless but alarming shock, the bird will be deterred from landing on this PVC base 10. However, these known siring systems are difficult to install (requiring specially trained installers) and do not efficiently utilize wires to maximize the coverage area of the desired region.

SUMMARY OF THE INVENTION

The present invention is directed to an electrical shock system for deterring birds from entering defined regions. One objective of the present invention is to provide a wiring system that maximizes that amount of the defined regions that will be covered by the system while minimizing the amount of wires so that the system may be installed efficiently. As a result, the bird control system of the present invention will provide better coverage over the desired regions and will therefore provide more effective in permanently keeping the birds from returning to the desired regions.

Another objective of the present invention is directed to an electrical shock system for deterring small creatures from entering the defined regions with a wiring system having an even number of wires.

A still further objective of the present invention is directed to a wiring system having stands for the wires offset so that the wiring system is sufficiently raised for preventing the wires from being covered with ice, dirt, snow, leaves and other debris that may prevent the system from operating.

Additional objects and features of the present invention will become apparent from the following detailed description of the invention taken in conjunction with the accompanying drawings.

DRAWINGS

The preferred embodiments of the present invention are illustrated with reference to the accompanying drawings, wherein:

FIG. 1 illustrates a known electrical shock system used for bird control;

FIG. 2 illustrates a wiring system used for the bird control system according to one embodiments of the present invention; and FIG. 3 is a view illustrating the connections used for the bird control system according to an embodiment of the present invention.

DETAILED DESCRIPTION FOR THE PREFERRED EMBODIMENTS OF THE PRESENT INVENTION

The present invention is directed to a wiring system for deterring animals, small creatures and birds from entering defined regions. The wiring system according to the embodiments of the present invention maximizes the coverage area for these electrical deterrent regions while minimizing the amount of wire and material to provide this coverage. A wiring system 200 for one embodiment of the present invention will be described with reference to FIG. 2. The wiring system 200 includes first wires $210_1, 210_2, \ldots, 210_n$ having a first polarity and second wires $220_1, 220_2, \ldots 220_n$ having a second polarity opposite to the first polarity that alternate between the first wires $210_n$. It is essential to have the first wires $210_n$ and the second wires $220_n$ alternate so that any two adjacent wires have opposite polarities. For example, the wiring system 200 may be configured so that the first wires $210_n$ have a positive polarity and the second wires $220_n$ have a negative polarity. Because the wiring system 200 is configured so that any two wires are opposite in polarity, a circuit will be completed that generates an electrical shock any time that a creature or bird touches two adjacent wires.

The wiring system 200 of FIG. 2 may be easily set up and modified to provide an optimal deterrent system for any creature or bird from a desired region or area. For instance, the wires $210_n$ and $220_n$ may be uniformly spaced at approximately one-half to one inch apart to provide a ledge or landing area for smaller birds or creatures. If it is desired to prevent larger birds from entering desired regions, the wires $210_n$ and $220_n$ may be spaced from 2–6 inches apart so that a ledge or landing area is provided for slightly larger creatures or birds. Further, the wires $210_n$ and $220_n$ may be spaced at greater distances for even larger creatures or birds. The embodiments of the present invention allows for easy installation and efficient use of the wiring system.

In other embodiments of the present invention, it is not necessary for the spacing of the wires $210_n$ and $220_n$ to be uniform, the spacings may be varied so that one wiring system 200 may be configured to deter creatures of a variety of sizes. For instance, wires $210_1$ and $220_1$ may be spaced one inch apart for smaller creatures, wires $220_1$ and $210_2$ may be spaced two inches apart for slightly larger creatures and wires $210_2$ and $220_2$ may be spaced six inches apart for larger creatures.

The greatest consideration to be taken into account for when configuring the wiring system 200 is that the spacing between the wires $210_n$ and $220_n$ should not be too great. It can be easily seen that if the spacing is too large, a ledge or landing area having two wires of opposite polarities will not created for the creature or bird. As a result, the circuit will not be completed and the creature or bird will not receive the electrical shock. On the other hand, if the spacing between the wires is too close together, the creature or bird will not perch or land on two adjacent wires. As a result, it is possible that the circuit will not be completed for applying the electrical shock because the creature may be perched on wires that are not adjacent and are therefore not guaranteed to have opposite polarities for completing the circuit. More specifically, the creature may land on wires $210_1$ and $210_2$ which are wires having the same polarity and the circuit for applying the electrical shock will not be completed.

The wires $210_1$ and $210_2$ should also be positioned an appropriate height above the surface for the intended creature while considering the tension of the wires $210_1$ and $210_2$. For instance, if a small and light creature is desired to be deterred by the system, a height of approximately one inch above the surface should be appropriate for a given tension strength of the wires. However, if a larger and heavier creature is desired to be deterred, a height of greater than one inch above the surface would be necessary for the same tension strength of the wires.

A further embodiment of the present invention is illustrated in FIG. 3 for a serpentine wiring system 300. In this wiring system 300, a wire 310 having a first polarity serpentines with a wire 320 having a second polarity opposite to the first polarity so that the wire 310 is always directly adjacent to the wire 320. To allow the wires 310 and 320 to serpentine, insulative material $312_1$, $322_1$, $312_2$, $322_2$, . . . $312_n$, and $322_n$ is placed to completely surround the wires 310 and 320 when they overlap so that the wires 310 and 320 do not short together. The insulative material may be vinyl tubing or the like. A power generator 350 supplies power to the wires 310 and 320 so that they are charged to opposite polarities (i.e., one wire as positive and the other wire as negative). The power generator 350 is preferably a solar electric power source such as a generator having a solar panel and a 6 volt gel cell battery. Alternatively, the power generator 350 may be a plug-in or hard-wired source. In any event, the power generator 350 should be configured to supply the creatures with an effective but safe electrical shock when the creature touches two wires having opposite polarities. However, the power generator 350 may be any other suitable power source for providing the safe electrical shock for the particular application.

The wiring system 300 further includes insulative supports $330_1$, $330_2$, . . . $330_n$ spaced at intervals underneath the wires 310 and 320. The insulative supports $330_n$ are spaced at intervals and heights so that the wires 310 and 320 are within a suitable tensile strength range which prevents the wires 310 and 320 from touching the ground or surface below the wiring system 300. For instance, the insulative supports $330n$ may be spaced approximately 4 feet apart at a height of 4 inches for most applications. In addition, standoffs may be positioned in association with the supports $330n$ so that the height of the grid of wires 310 and 320 can be adjusted above the ground or surface. These standoffs will prevent the wires 310 and 320 from short circuiting or malfunctioning due to weather conditions such as snow, ice and water, and environmental changes such as leaves dirt and other debris.

It is to be understood that the present disclosure, including the detailed description of the preferred embodiment of the invention, is made by way of example and that various other embodiments are possible without departing from the subject matter coming within the scope of the following claims, which subject matter is regarded as the invention.

What is claimed is:

1. A system for inhibiting creatures/animals/birds from penetrating desired regions, comprising:

a series of wires having alternating polarity positioned to cover the desired regions;

a support structure for positioning said series of wires so that said series of wires are within a predetermined tensile strength range for maintaining said series of wires above a surface and maintaining predetermined distances between adjacent wires in said series of wires; and a power source for supplying power to said series of wires.

2. The system according to claim 1, wherein said series of wires having alternating polarities comprise an equal number of positive and negative wires that are positioned substantially parallel to each other.

3. The system according to claim 2, wherein said support structure comprises insulative rods for maintaining said predetermined tensile strength range and said predetermined distances between said positive and negative wires.

4. The system according to claim 1, wherein said power source comprises a solar generator.

5. The system according to claim 1, wherein said power source comprises a solar generator.

6. A system for inhibiting birds from landing on edges of structures, comprising:

a series of wires having opposite polarites attached to the edges of the structures;

a support structure for positioning said series of wires so that said series of wires are within a predetermined tensile strength range for maintaining said series of wires above a surface and maintaining predetermined distances between adjacent wires in said series of wires; and a power source for supplying power to said series of wires.

7. The system according to claim 6, wherein said series of wires having opposite polarities comprise an equal number of positive and negative wires that are positioned substantially parallel to each other.

8. The system according to claim 7, wherein said support structure comprises insulative rods for maintaining said predetermined tensile strength range and said predetermined distances between said positive and negative wires.

9. A method for inhibiting creatures/animals/birds from penetrating desired regions, comprising the steps of:
   positioning a series of wires having alternating polarity to cover the desired regions;
   maintaining said series of wires above a surface and maintaining predetermined distances between adjacent wires in said series of wires so that they are within a predetermined tensile strength range; and
   supplying power to said series of wires.

10. The method according to claim 9, wherein said series of wires having alternating polarities comprise an equal number of positive and negative wires that are positioned substantially parallel to each other.

* * * * *